United States Patent

Okada et al.

[11] Patent Number: 5,844,536
[45] Date of Patent: Dec. 1, 1998

[54] DISPLAY APPARATUS

[75] Inventors: Shinjiro Okada, Isehara; Yutaka Inaba, Kawaguchi; Takashi Kato, Asaka; Kazunori Katakura, Atsugi, all of Japan

[73] Assignee: Canon Kabushiki Kaisha, Tokyo, Japan

[21] Appl. No.: 463,863

[22] Filed: Jun. 6, 1995

Related U.S. Application Data

[63] Continuation of Ser. No. 41,420, Mar. 31, 1993, abandoned.

[30] Foreign Application Priority Data

Apr. 1, 1992 [JP] Japan .................. 4-105285

[51] Int. Cl.$^6$ ...................................... G09G 3/36
[52] U.S. Cl. ................................. 345/94; 345/97
[58] Field of Search .................. 345/87, 92, 94, 345/96, 97, 55; 359/54, 56, 59; 349/39, 42, 41

[56] References Cited

U.S. PATENT DOCUMENTS

| | | | |
|---|---|---|---|
| 4,367,924 | 1/1983 | Clark et al. . | |
| 4,380,008 | 4/1983 | Kawakami et al. | 340/784 |
| 4,655,561 | 4/1987 | Kanbe et al. . | |
| 4,681,404 | 7/1987 | Okada et al. | 345/97 |
| 4,712,877 | 12/1987 | Okada et al. . | |
| 4,747,671 | 5/1988 | Takahashi et al. . | |
| 4,763,994 | 8/1988 | Kaenko et al. . | |
| 5,136,282 | 8/1992 | Inaba et al. . | |

FOREIGN PATENT DOCUMENTS

| | | |
|---|---|---|
| 306822 | 3/1989 | European Pat. Off. . |
| 61-94023 | 5/1986 | Japan . |
| 0394903 | 10/1989 | Japan . |
| 02162322 | 6/1990 | Japan . |

OTHER PUBLICATIONS

Patent Abstracts of Japan, vol. 14, No. 419 (P–1103) (Sep. 1990).

Japanese Journal of Applied Physics, Y. Yamada et al. "Ferroelectric Liquid Crystal Display Using Tristable Switching," vol. 29, No. 9, pp. 1757–1764 (1990).

Eurodisplay '90 Proceedings, M. Matsunaga et al., "Multiplex Driving Method of the FLC Device," pp. 296–298 (1990).

Mol. Cryst. Lig. Cryst., vol. 94, nos. 1 and 2 (1983), pp. 213–234, Clark et al., "Ferroelectric Liquid Crystal Electro–Optics Using the Surface Stabilized Structure".

*Primary Examiner*—Chanh Nguyen
*Attorney, Agent, or Firm*—Fitzpatrick, Cella, Harper & Scinto

[57] ABSTRACT

A display apparatus is constituted by a display device including a plurality of scanning lines, a plurality of data lines intersecting the scanning lines, and a pixel formed at each intersection of the scanning lines and data lines and showing plural display states depending on signals applied to an associated scanning line and an associated data line. The display device is driven by applying a selection signal to the scanning lines and applying to the data lines data signals for causing prescribed display states at the pixels in association with the selection signal. Further, at least one scanning line in a nonselected state is supplied with a dummy signal for temporarily changing display states of pixels on the at least one scanning line, whereby flickering on the display device is suppressed. The display apparatus is also applicable to gradational display.

13 Claims, 14 Drawing Sheets

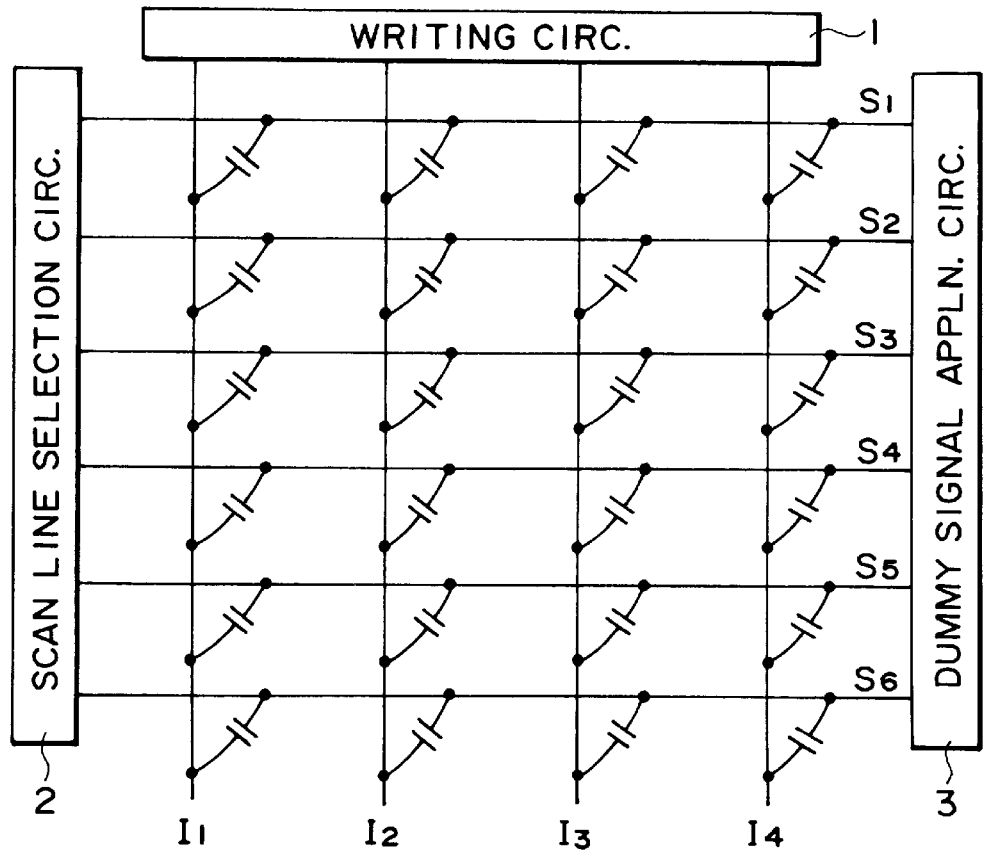
F I G. 4
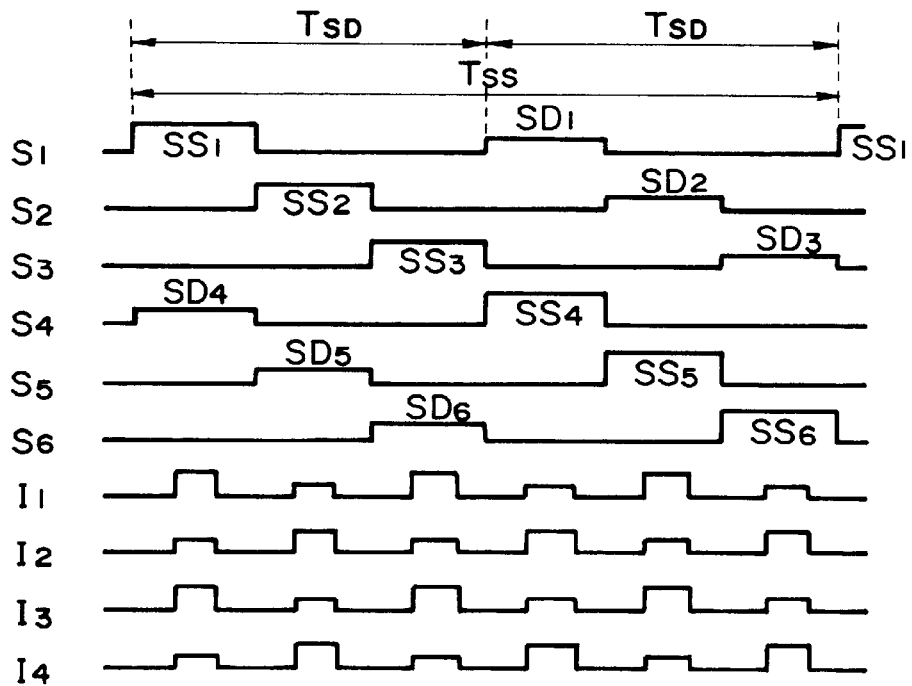
F I G. 5

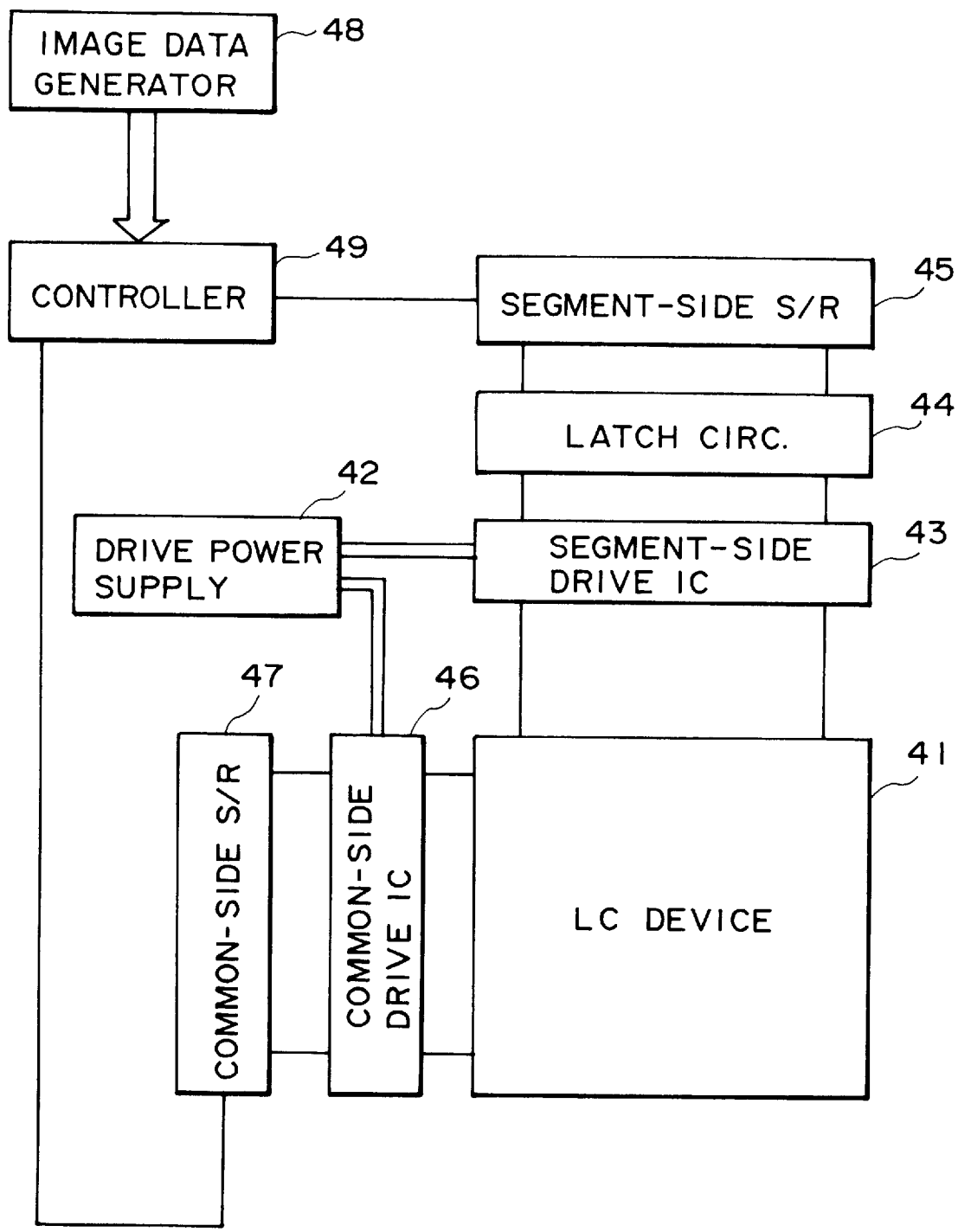
F I G. 14

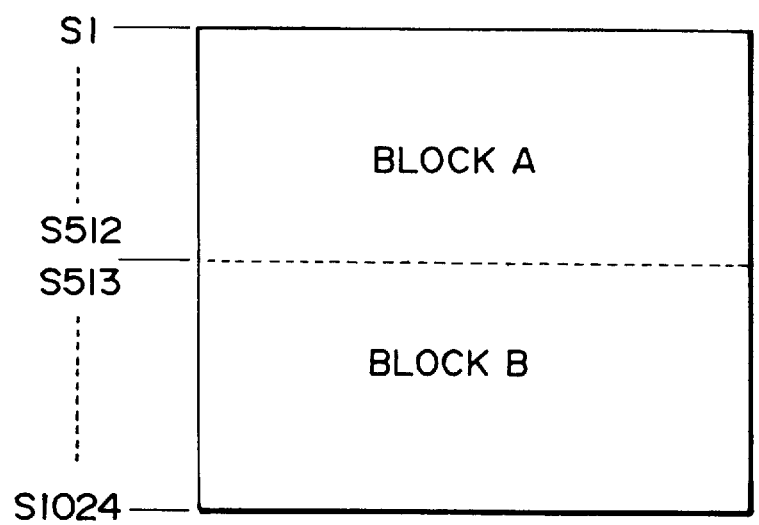
F I G. 15

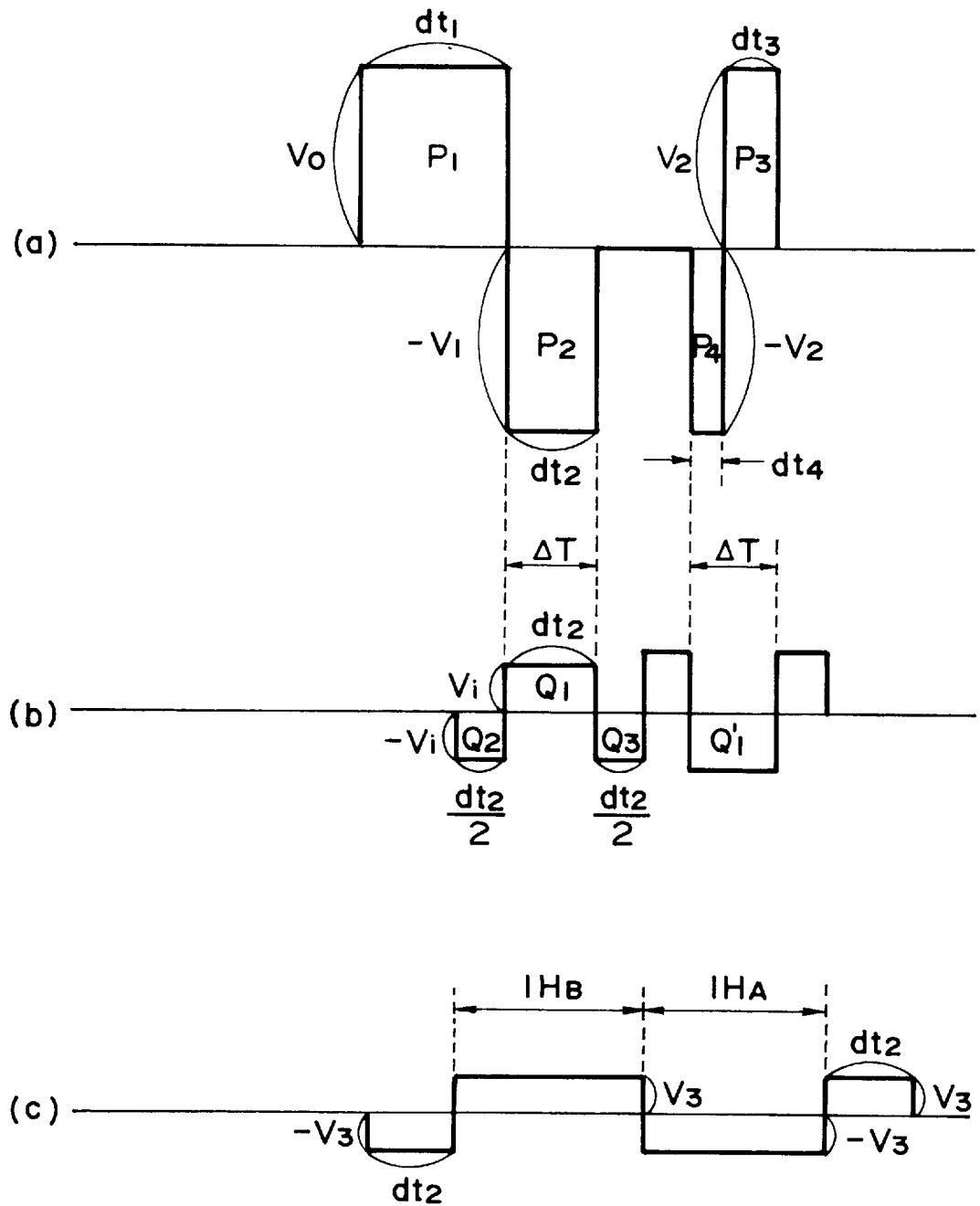
F I G. 16

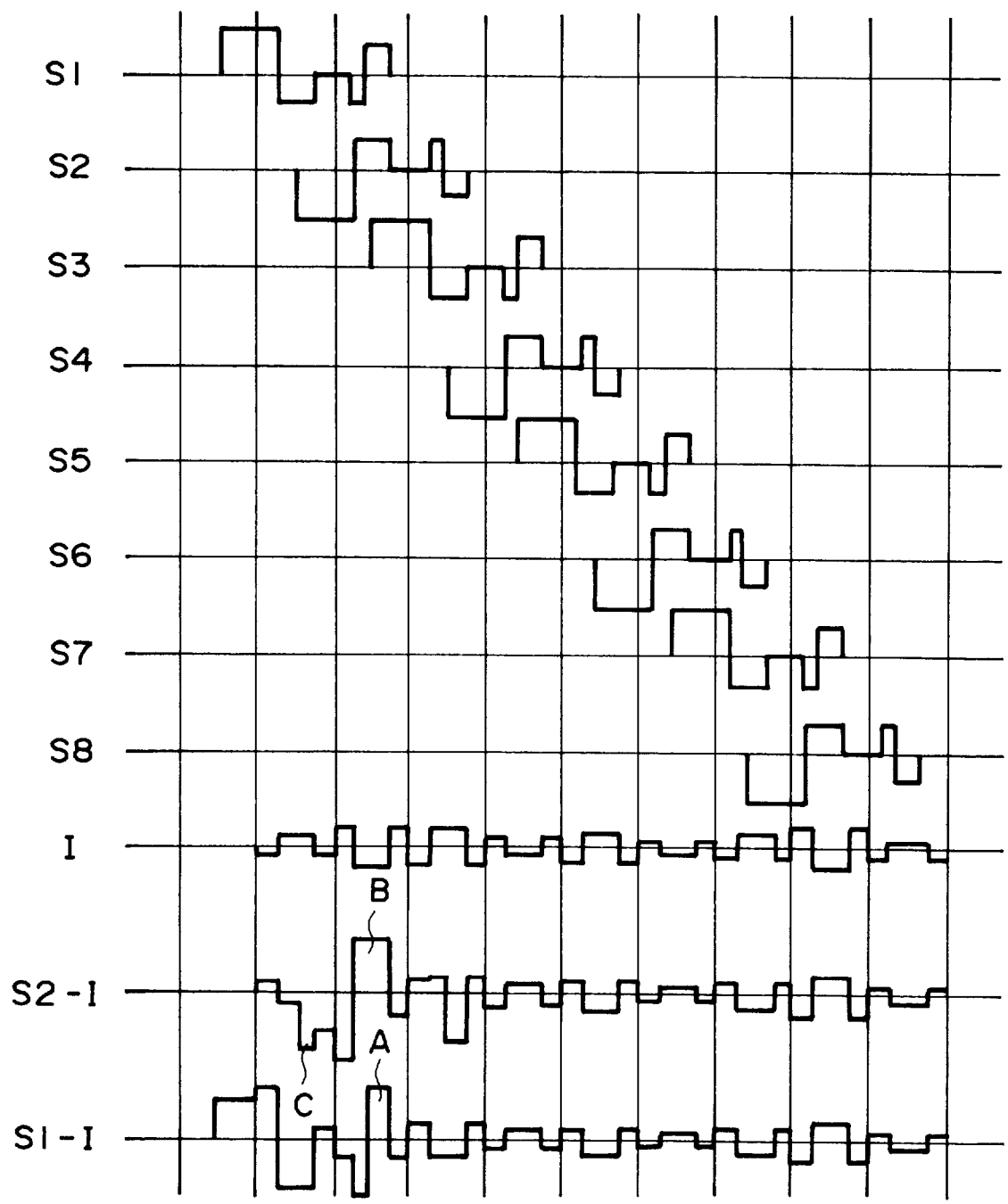
F I G. 17

DISPLAY APPARATUS

This application is a continuation of application Ser. No. 08/041,420 filed Mar. 31, 1993, now abandoned.

FIELD OF THE INVENTION AND RELATED ART

The present invention relates to a display apparatus for use in a television receiver, a computer terminal, an image data processing apparatus, such as a video camera view finder, etc., particularly a planar or flat panel-type display apparatus having scanning lines and data (signal) lines.

Planar display apparatus include, for example, a type using electron-discharging elements at respective pixels and a type using a liquid crystal for constituting pixels. Among others, a liquid crystal display apparatus using a liquid crystal has been widely used and is calling a further attention.

A liquid crystal device used in an actual display apparatus is, e.g., constituted by a simple matrix electrode plate as shown in FIGS. 1A and 1B. Referring to FIG. 1A which is sectional view, the device having a cell structure including glass substrates 21a and 21b on which are disposed stripe electrodes 22a and 22b of ITO, etc., insulating films 23a and 23b of silicon dioxide, etc., and alignment films 24a and 24b of polyimide,. etc., a sealing member 25, and a liquid crystal 26 sealed up within the cell.

FIG. 1B is a plan view of an electrode plate 21a having stripe electrodes 22a thereon, and another electrode plate 21b has a similar structure.

These electrode plates 21a and 21b are applied to each other with a gap therebetween so that their stripe electrodes 22a and 22b intersect each other to form a cell, which is filled with a liquid crystal 26 to form a device as shown in FIG. 1A. The liquid crystal 26 may for example be a twisted nematic liquid crystal.

FIG. 2 is a circuit diagram of such a display apparatus indicated with simplification as a 6×4 matrix arrangement. One group of stripe electrodes are used as scanning lines $S_1$–$S_6$ connected to a scanning line selection circuit 2 such as a vertical shift register, and the other group of stripe electrodes are used as data lines $I_1$–$I_4$ connected to a writing circuit 1.

Such a display apparatus is driven to display images in the following manner.

A scanning line $S_1$ is selected by a shift register 2 to be supplied with a scanning pulse. Synchronized with the scanning pulse, data signals are simultaneously supplied to four data lines $I_1$–$I_4$, whereby electric fields obtained by combination of the scanning pulse and data signals are applied to four pixels on the scanning line $S_1$ to form one line of images showing transmittances corresponding to the electric fields.

Then, the above driving operation is performed with respect to pixels on a subsequent scanning line $S_2$.

Further, a similar operation is sequentially performed on scanning lines $S_3$–$S_6$ to form one picture image.

FIG. 3 is a timing chart summarizing the above-described driving method. In FIG. 3, the scanning pulse and the data signals are respectively represented by a single rectangular pulse but actually these signals have various waveforms appropriately selected depending on various factors, such as the liquid crystal used.

A time period (one frame period) required for displaying one picture image is appropriately determined depending on the properties of the liquid crystal material, etc. If this period is long, i.e., if the frame frequency is low, flickering of the picture occurs.

More specifically, the flickering is a phenomenon that light quantity change caused at a part of writing in one picture is recognizable to human eyes when the speed of writing one picture of an image display device is slow. For example, in the case of a ferroelectric liquid crystal device, it is often practiced to use two steps of clearing and writing in order to effectively utilize a memory characteristic thereof. Further, in case of using a line-sequential writing scheme of writing on scanning lines line by line, the light quantity change during one writing period is large. The flickering is most noticeable when one picture is written line-sequentially. However, even in the case of writing one picture in an interlaced scanning mode of scanning every 32-th line, the flickering is not completely removed. More specifically, if an interlaced scanning mode is adopted, the flickering is averaged over the entire picture, but some flickering still occurs locally because of slow scanning. The lower limit of one-line selection period for a ferroelectric liquid crystal panel at present is on the order of 100 μsec. If the selection period is shortened further, a delay due to writing resistance in a panel is not negligible, so that it is difficult to realize a large-area, high-definition liquid crystal display device. On the other hand, a frame frequency of at least 40 Hz is necessary in order to make the flickering unnoticeable by such a line-sequential writing mode. In case where the one-line selection period is 100 μsec, the frame frequency of a panel having 1025 scanning lines becomes 9.8 Hz thus causing flickering. In other words, in order to realize a frame frequency of 40 Hz, the one-line selection time must be reduced to 24.4 μsec. However, it is sometimes difficult to further shorten the one-line selection period by a restriction of responsive speed depending on a liquid crystal material used.

SUMMARY OF THE INVENTION

In view of the above-mentioned problems, an object of the present invention is to provide a display apparatus capable of displaying images with suppressed flickering.

Another object of the present invention is to provide a display apparatus capable of displaying images with suppressed flickering without being affected by electrical response characteristic of a functional material, such as liquid crystal, constituting pixels.

A further object of the present invention is to provide a display apparatus provided with a flickering-suppressing function having a wide applicability through improvement of driving scheme.

A still further object of the present invention is to provide a display apparatus suitable for gradational (or gray-scale) display.

According to the present invention, there is provided a display apparatus, comprising:

a display device comprising a plurality of scanning lines, a plurality of data lines intersecting the scanning lines, and a pixel formed at each intersection of the scanning lines and data lines and showing plural display states depending on signals applied to an associated scanning line and an associated data line, writing means for applying a selection signal to the scanning lines and applying to the data lines data signals for causing prescribed display states at the pixels in association with the selection signal, and signal application means for applying to at least one scanning line in a nonselected state a dummy signal for temporarily changing display states of pixels on said at least one scanning line.

According to another aspect of the present invention, there is provided a display apparatus, comprising:

a display device comprising a plurality of scanning lines, a plurality of data lines intersecting the scanning line, and a pixel formed at each intersection of the scanning lines and the data lines, a selection signal applying circuit for applying a selection signal to at least two adjacent scanning lines, a data signal applying circuit for applying data signals comprising a gradation data to said plurality of data lines, and a dummy signal applying circuit for applying a dummy signal to at least one of remaining scanning lines other than said at least two adjacent scanning lines receiving the selection signal, wherein said selection signal includes a signal applied to one of said at least two adjacent scanning lines, which signal includes a signal component compensating for a display state given by a signal applied to the other of said at least two adjacent scanning lines.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a circuit diagram of a display apparatus according to the invention.

FIG. 5 is a timing chart (waveform diagram) for illustrating a driving scheme for a display apparatus according to the invention.

FIG. 14 is a drive system block diagram of a display apparatus according to Example 1.

FIG. 15 is a block map for illustrating blocks allotted in a display panel according to Example 2 of the invention.

FIG. 16 is a schematic waveform diagram for illustrating a relationship among a scanning selection signal (a), a data signal (b) and a dummy signal (c) for a display apparatus according to Example 1.

FIGS. 17 and 18 are drive timing charts for a display apparatus according to Example 1.

DESCRIPTION OF THE PREFERRED EMBODIMENTS

In a display apparatus according to a preferred embodiment of the present invention, a dummy signal for suppressing flickering is applied to a scanning line in addition to a selection signal periodically applied for selecting a scanning line for writing.

More specifically, during a period from a time of a scanning line receiving a selection signal until a time of the scanning line receiving a subsequent selection signal, a dummy signal is applied to the scanning line, whereby the period in which one scanning line receives a signal is shortened, i.e., the frequency of applied signals is increased, thereby suppressing flicker.

Figure 1A:
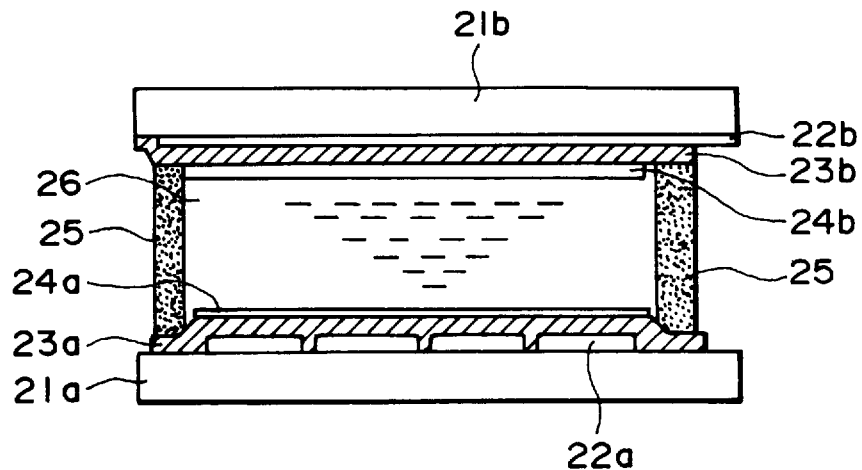
FIG. 1A is a schematic sectional view of a display apparatus and FIG. 1B is a plan view of an electrode plate used in the apparatus.
Figure 1B:
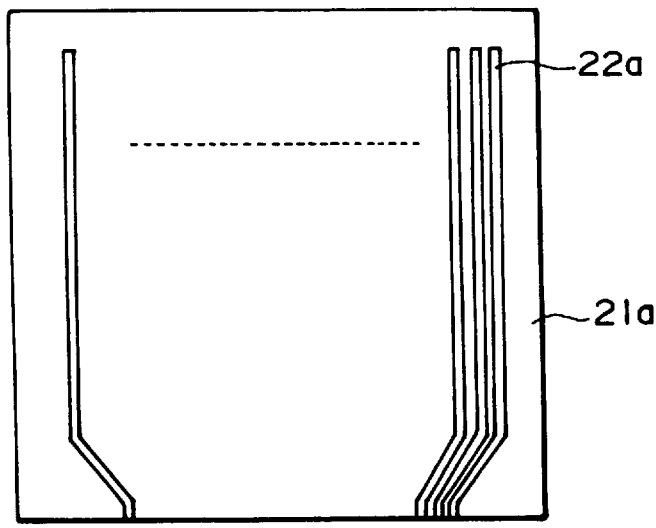
Figure 2:
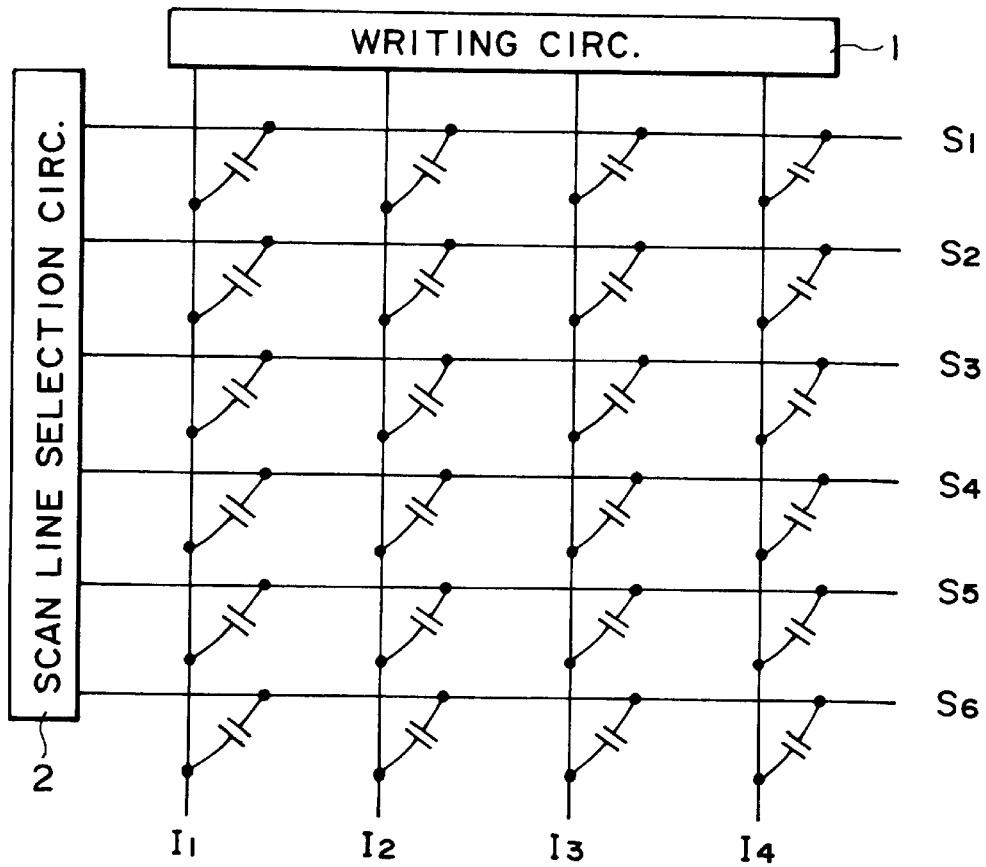
FIG. 2 is a circuit diagram of a prior art display apparatus.
Figure 3:
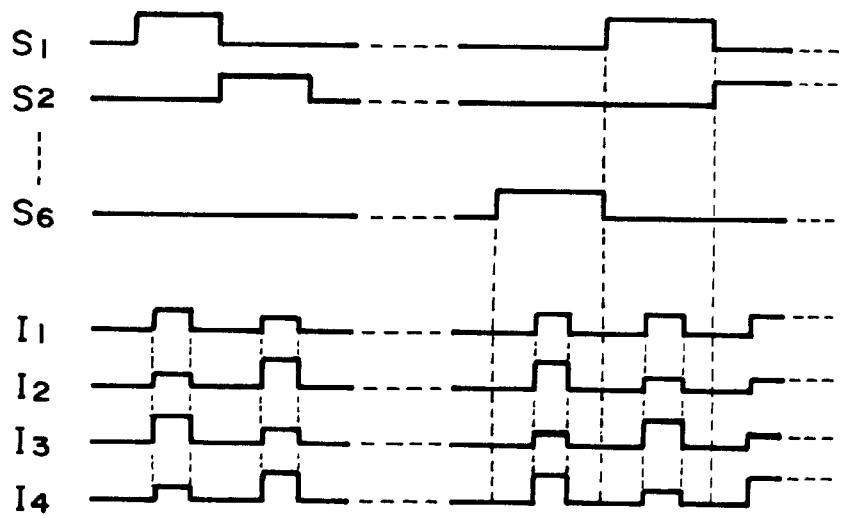
FIG. 3 is a timing chart for illustrating a driving method for the prior art display apparatus.

FIG. 4 is a circuit diagram of a display apparatus according to an embodiment of the present invention, which is shown to have a matrix of 6×4 pixels corresponding to FIG. 2. FIG. 5 is a timing chart for driving the apparatus.

As shown in FIG. 4, in addition to a scanning line selection circuit 2, a dummy signal application circuit 3 is connected to scanning lines $S_1$–$S_6$, while data lines $I_1$–$I_4$ are connected to a writing circuit 1. As shown in FIG. 5, during one period $T_{SS}$ of a scanning line $S_1$ receiving a selection signal $SS_1$, a dummy signal $SD_1$ is applied to $S_1$, whereby the period of the scanning line $S_1$ receiving one application signal is shortened from $T_{SS}$ to $T_{SD}$. Herein, the application includes both a selection signal and a dummy signal. Similarly, the other scanning lines $S_2$–$S_6$ sequentially receive selection signals $SS_2$–$SS_6$ and dummy signals $SD_2$–$SD_6$, respectively.

Figure 6:
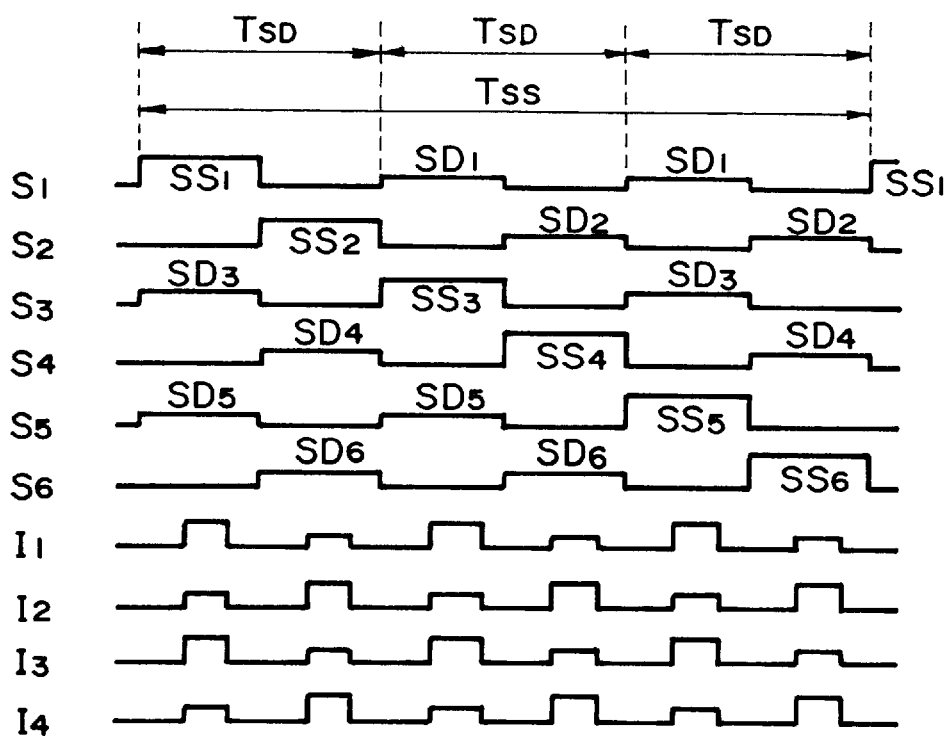
FIG. 6 is a timing chart for illustrating another driving scheme for a display apparatus according to the invention.

FIG. 6 is a timing chart showing another driving scheme wherein dummy signals $SD_1$–$SD_6$ are applied so as to reduce the period of receiving one application signal is reduced to $T_{SS}/3$ in contrast with the scheme of FIG. 5 wherein the period is reduced to $T_{SS}/2$.

In FIG. 4, the selection signal application circuit 2 and the dummy signal application circuit 3 are depicted separately but can be consolidated into one circuit block.

In FIGS. 5 and 6, the scanning line selection signal, data signal and dummy signal are depicted as the simplest rectangular pulses but this is merely convenience for easy comprehension of a basic technical concept of the present invention. These signals may have appropriately designed waveforms depending on, e.g., image data to be displayed and the function material used.

The scanning line selection signal used in the present invention is a signal for writing on each scanning line in displaying a picture on a display screen or panel and is used to change the display states of pixels on a scanning line concerned in association with data signals applied to data lines. Preferably, the selection signal includes a reset signal component capable of resetting all the pixels concerned into a basic state of wholly black or wholly white in case where the data lines are placed in a base potential receiving no data signal or regardless of the states of the data signals.

On the other hand, the data signals may preferably be signals not substantially changing the display states of pixels concerned when the scanning line concerned receives no selection signal.

Further, the dummy signal may preferably be a signal capable of temporarily changing the display states of pixels concerned to some extent in association with the data signals but restoring the display states of the pixels to those prior to application of the dummy signal after the dummy signal is removed.

The amplitude and pulse duration of the dummy signal may be appropriately determined depending on the structure of a pixel, the functional material constituting the pixel, etc.

In the case where a pixel is constituted by using a liquid crystal, particularly a ferroelectric liquid crystal, the dummy signal may preferably have a waveform which does not switch the liquid crystal molecules from one stable state to the other stable state but is sufficient to temporarily change the orientation of the liquid crystal molecules, thus causing some change in optical transmittance. More specifically, the dummy signal is so set that an energy (or voltage) resulting from the combination of a dummy signal and a data signal does not exceed an inversion threshold energy (voltage) of the liquid crystal. By so setting the dummy signal, a pixel can change its display state on application of the dummy signal but restore the previous state after removal of the dummy signal.

In contrast thereto, a selection signal applied to a scanning line for pixels using a ferroelectric liquid crystal is a signal capable of converting all the liquid crystal molecules in a pixel or the liquid crystal molecules constituting a partial domain in a pixel from one stable state to the other stable state in association with a data signal.

Returning to the function of the present invention, flickering occurs in case of slow writing speed as has been already mentioned. Flickering becomes unnoticeable, if the writing speed exceeds 40 Hz in terms of frame frequency. This is because the reaction of human eyes cannot follow an image change if the same picture state is formed 40 times or more in one sec. Accordingly, it is assumed that flickering becomes unnoticeable if an identical picture state is formed about 40 times a second even if the frame frequency is as low as 9.8 Hz. Accordingly, when a scanning line constituting a picture is noted, if a drive circuit is so designed that a dummy signal is applied to the scanning line after the scanning line is once selected and the light quantity change caused by application of the dummy signal is not significantly different from the change caused by application of the selection signal, the pixels on the scanning line are apparently placed in a state similar to the case where the pixels are selected at a cycle of 25 msec. Thus, an identical picture state is formed 40 times a second so that flickering becomes unnoticeable.

Figure 7:
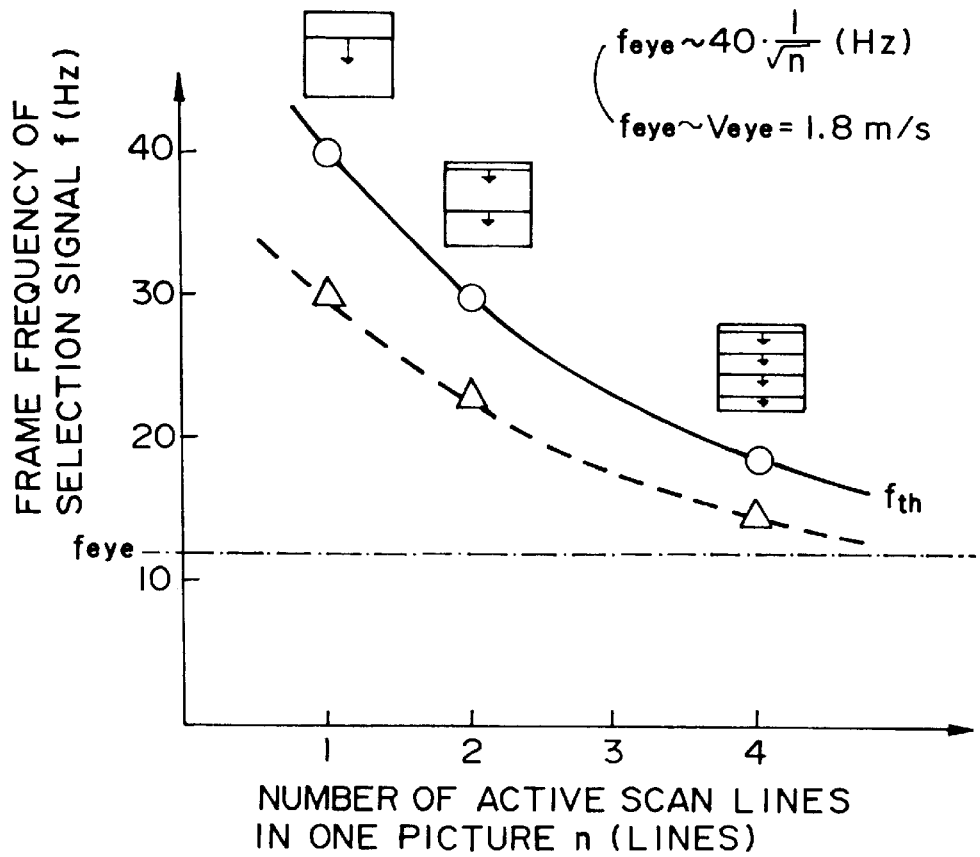
FIG. 7 is a graph for illustrating a relationship between a frame frequency of selection signal and flickering.

The above-mentioned phenomenon is explained with reference to FIG. 7, which is a graph obtained as a result of our study. Referring to FIG. 7, the ordinate represents a frame frequency of selection signal for scanning one picture, and the abscissa represents the number (n) of active scanning lines. Herein, the active scanning line means a scanning line which is receiving a selection signal or a dummy signal. Accordingly, n=1 in the case where one frame is written by selecting one scanning line at a time, and n=2 in the case where writing is effected by selecting two scanning lines at a time. Further, n=3 in the case where two lines are selected at a time and one line receives a dummy signal simultaneously. It is preferred that active scanning lines are disposed with equal spacings therebetween. This means that a particular scanning line noted has a constant time spacing (TSD) from a time when the line is active to a time when the line is subsequently active. The circular marks connected by a solid line in FIG. 7 represent minimum frame frequencies for obviating flickering at respective values of n. A frequency of 40 Hz is required at n=1, while the frequency is reduced to about 30 Hz at n=2 and about 19.2 Hz at n=4. The minimum frequency (fth) for obviating flickering and the number (n) of active scanning lines are summarized by the following relationship:

$$f_{th} = 40/n^{1/2} \qquad (1).$$

The relationship (1) showing that $f_{th}$ is proportional to $1/n^{1/2}$ at a glance appears curious in view of the explanation so far made, which might rather suggest a relationship of fth being proportional to $1/n$. It is considered that the difference between the actually measured data shown in FIG. 7 and the previous explanation may be attributable to the following factors. A frequency $f_{eye}$ shown in FIG. 7 represents a frequency below which human eyes can follow instantaneously a picture change even if the number (n) of active scanning lines is increased. Accordingly, below the frequency $f_{eye}$. The frequency $f_{eye}$ is tentatively shown as 12 Hz in FIG. 7 but can be different for individuals, e.g., in a range of about 5–12 Hz. This may be reflected in commercialization. It is considered that $f_{eye}$ depends on the moving velocity of scanning lines ($V_{eye}$=1.8 m/sec in the case of FIG. 7) rather than on the frame frequency. Anyway, it is considered that the reason why $f_{th}$ does not change linearly with an increase in n is attributable to a phenomenon that the minimum frequency for obviating flickering gradually approaches not to zero but to $f_{eye}$ because of the presence of $f_{eye}$ and human eyes characteristics giving $f_{eye}$. In FIG. 7, triangular marks connected by a dashed line represent frequencies causing an acceptable degree of flickering. As described above, even in case where a picture display drive cannot be effected at 40 Hz because of a slow one line selection time, it is possible to realize a flicker-free picture by application of a dummy signal to increase the number of active scanning lines on one picture.

A pixel used in the present invention may preferably be one comprising a liquid crystal sandwiched between a pair of electrodes or one obtained by further adding thereto an active element, such as a MIM element.

The liquid crystal may preferably be a nematic liquid crystal or a ferroelectric liquid crystal (FLC).

A ferroelectric liquid crystal shows a quick response speed and have many advantages, such as a wide viewing angle, when used in a display apparatus, so that it is particularly suitably used in the present invention.

Display apparatus using a ferroelectric liquid crystal have been described in detail, e.g., in U.S. Pat. No. 4,367,924 issued to N. A. Clark and Lagerwall, U.S. Pat. No. 4,655,561 issued to Kanbe, et al., Japanese Laid-Open Patent Application (JP-A) 61-94023, and N. A. Clark, et al. MCLC, 1983, Vol. 94, pp. 213–214.

Such a display apparatus using a ferroelectric liquid crystal may for example have a structure including a pair of glass plates each having transparent electrodes thereon and provided with an aligning treatment and disposed opposite to each other with a gap on the order of 1–3 $\mu$m therebetween to form a cell, and a ferroelectric liquid crystal injected into the cell. The display apparatus using a ferroelectric liquid crystal has advantageous features that the switching can be effected by utilizing a force of coupling of a spontaneous polarization of the ferroelectric liquid crystal and an external electric field, and the switching can be effected depending on the polarity of the external electric field because the long axis of an FLC molecule corresponds to the polarization direction of the spontaneous polarization in a one-to-one correspondence. The ferroelectric liquid crystal may generally comprise a chiral smectic liquid crystal (SmC*, SmH*) and is therefore shows an alignment that its molecular long axis is helical. However, if the ferroelectric liquid crystal is disposed in a cell having a cell gap on the order of 1–3 μm as described above, the helix of the liquid crystal molecular long axis is unwound.

The display apparatus according to the present invention may be one displaying binary image data, such as white and black, or one displaying multi-value image data such as a color image and/or a gradational (gray-scale) image.

A particularly suitable example of display method is one using a ferroelectric liquid crystal showing a good responsiveness and a wide viewing angle for a gradational display.

Examples of such a gradational display method using a ferroelectric liquid crystal may include those disclosed in U.S. Pat. No. 4,712,877 issued to Okada et al, U.S. Pat. No. 4,747,671, and U.S. Pat. No. 4,763,994 issue to Kaneko et al.

More specifically, such gradational display methods may be representatively classified into (1) a method of dividing a pixel into sub-pixels which are controlled independently (dither method), (2) a method of forming a potential gradient in a pixel to divide the pixel into display regions (potential gradient method), (3) a method of applying a unidirectional electric field to a liquid crystal in a monostable state to control the deviation of the liquid crystal molecular long axis depending on the intensity of the electric field, and (4) a method of changing the liquid crystal layer thickness within a pixel to change the electric field intensity applied to the liquid crystal layer within the pixel, thus effecting a gradational display.

A problem in such a gradational display system using an FLC is that it causes a substantial change in threshold value corresponding to a temperature change, so that it is difficult to maintain an identical gradation level in resistance to a temperature change. In order to solve the problem, we have proposed a driving scheme which may be called a pixel shift method (two pulse method) in U.S. patent application Ser. No. 984,694, filed Dec. 2, 1992 entitled "Liquid Crystal Display Apparatus". As an outline, the driving scheme includes: (1) writing line-sequentially from a first line to an n-th line, while (2) simultaneously selecting consecutive two lb scanning lines (L-th and L-th+1) at a selection time and, at a subsequent selection time, selecting simultaneously consecutive two scanning lines (L-th+1 and L-th+2) deviated by one line, wherein L is an integer satisfying $1 \leq L \leq n$. Of the consecutive L-th and L-th+1 scanning lines, the L-th scanning line is a scanning line for temperature compensation for the L-th+1 scanning line. More specifically, if the liquid crystal cell is at a standard temperature, only the L-th+1 scanning line is written and, if the temperature deviates, the L-th line is written. In other words, display data to be displayed on the L-th+1 scanning line is shifted onto the L-th scanning line in accordance with a temperature change. Thus, an undesirable display state of a pixel on one scanning line of adjacent at least two scanning lines is compensated by a display state of a pixel on the other scanning line. That is, a synthetic display state of adjacent pixels on a data line and at least two scanning lines is used as a unit of gradational display. By this measure, an undesirable display state of a pixel in the unit can be compensated by a display state of the remaining pixel in the unit, whereby a normal display can be achieved as a whole.

In order to realize the above-described writing operation, the following conditions may be set. (3) The simultaneously selected (at least) two scanning lines are supplied with mutually different scanning signals, which are determined to provide continuous thresholds at two pixels formed at the intersections of a data line and the two scanning lines. The provision of "continuous threshold" is a condition for realizing a smooth data shift between two scanning lines which are sequentially written by a line-sequential scan. (4) A pixel is required to have a distribution of thresholds with respect to transmittance.

In such a driving method, however, image data changes its position according to a temperature change, so that it is difficult to completely display a one frame picture. More specifically, the pixels on the first scanning line are not provided with a scanning line to which image data is shifted, and the pixels on the n-th scanning line are not subjected to an operation after the image data shift according to a temperature change.

Secondly, as the scanning lines are selected line-sequentially from the first line to the n-th line, interlaced scanning cannot be performed. The frame frequency in the case of an FLC panel having 1024 lines is as low as 3–20 Hz, so that flickering is liable to occur on the entire panel if the interlaced scanning is not performed.

The present invention may be suitably applied to suppressing the flickering liable to be caused in the above-mentioned gradational drive scheme.

Hereinbelow, the present invention is described based on specific examples, which however should not be construed to restrict the scope of the invention. Particularly, within an extent of accomplishing the objects of the present invention, it is possible to replace the respective elements with equivalent substitutes or use additional elements.

EXAMPLE 1

Figure 8:
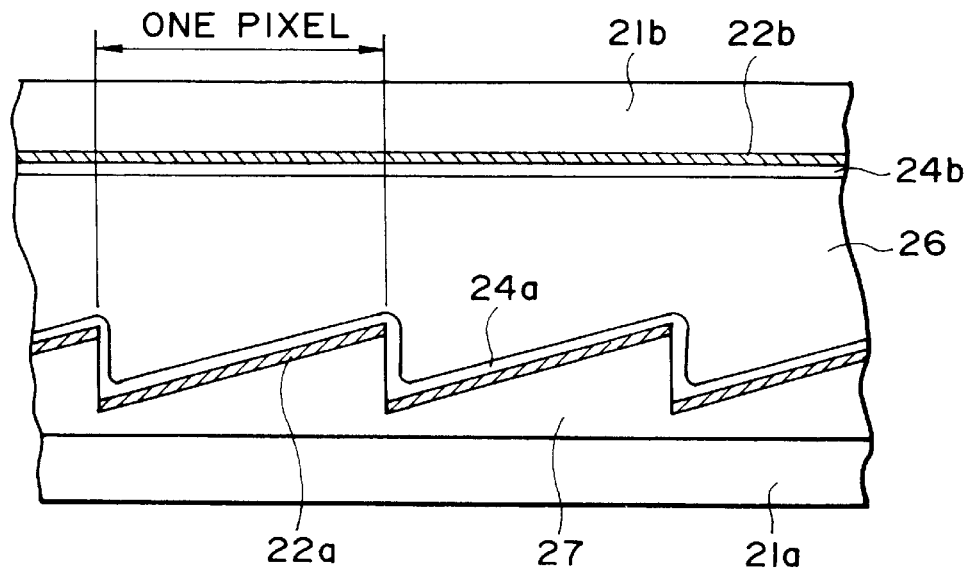
FIG. 8 is a schematic sectional view of a liquid crystal device in a display apparatus according to Example 1 of the invention.

As a first embodiment, a liquid crystal cell having a sectional shape as shown in FIG. 8 was prepared. Referring to FIG. 8, a lower glass substrate 21a was coated with a layer of acrylic UV-curable resin 27, which was then provided with a saw-tooth section by transfer of a mold surface shape and cured. The saw-toothed cured resin layer 27 was then coated with an about 1500 Å—ITO film by sputtering. Then, the ITO film was patterned into stripe electrodes (scanning lines) 22a so as to provide a one-pixel width corresponding to one saw-tooth side. The stripe electrodes 22a were then coated with a layer of a polyimide precursor ("LQ-1802", mfd. by Hitachi Kasei K.K.) by spin coating, followed by baking to form an about 300 Å-thick polyimide alignment film 24a. Separately, an opposite substrate (electrode plate) was formed by forming on a flat surface of a glass substrate 21 ITO stripe electrodes (data lines) 22b and thereon an alignment film 24b similar to the film 24a. Then, the alignment films 24a and 24b were respectively rubbed in one direction.

Figure 9:
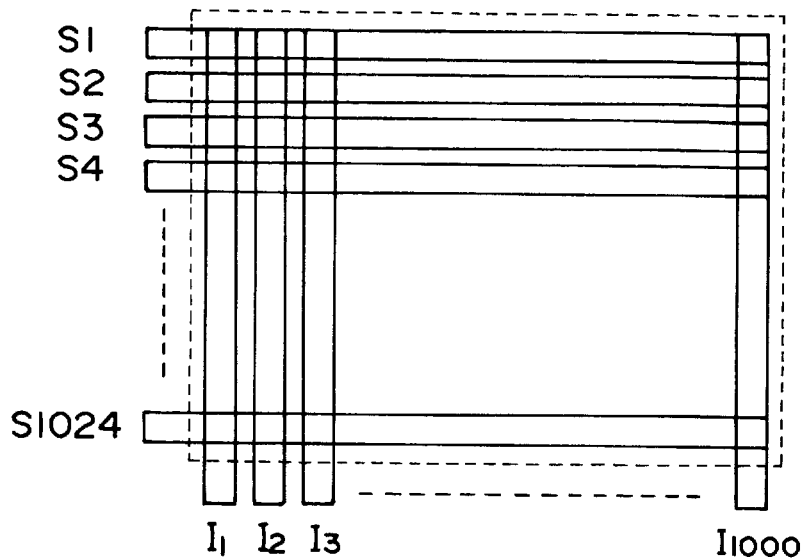
FIG. 9 is a plan view showing an electrode arrangement in a display apparatus according to Example 1 of the invention.

A pair of the rubbed substrates were superposed so that their rubbing directions were almost parallel but the rubbing direction of the lower substrate deviated by about 6 degrees in a right-screw direction with respect to the rubbing direction of the upper substrate to form a blank cell. The cell thickness (liquid crystal layer thickness) was controlled so that the smallest thickness was about 1.0 μm and the largest thickness was about 1.4 μm. The stripe electrode 22a was designed to have a width of 300 μm and the stripe electrode 22b was designed to have a width of 200 μm so as to provide a rectangular pixel size of 300 μm×200 μm. The resultant panel was as shown in FIG. 9 including scanning electrodes $S_1$–$S_{1024}$ as Y-direction electrodes and data electrodes $I_1$–$I_{1000}$ as X-direction electrodes. The used ferroelectric liquid crystal 26 showed a phase transition series and physical properties as shown in Table 1 below.

TABLE 1

Iso. $\xrightarrow{\underset{81.8° C.}{82.3° C.}}$ Ch. $\xrightarrow{\underset{77.3°}{76.6°C.}}$ SmA $\xrightarrow{54.8° C.}$ SmC* $\xrightarrow{\underset{-2.5° C.}{-20.9° C.}}$ Cryst.

Ps = 5.8 nC/cm² at 30° C.
Tilt angle = 14.3 degrees at 30° C.
Δε ≈ 0 at 30° C.

Figure 10:
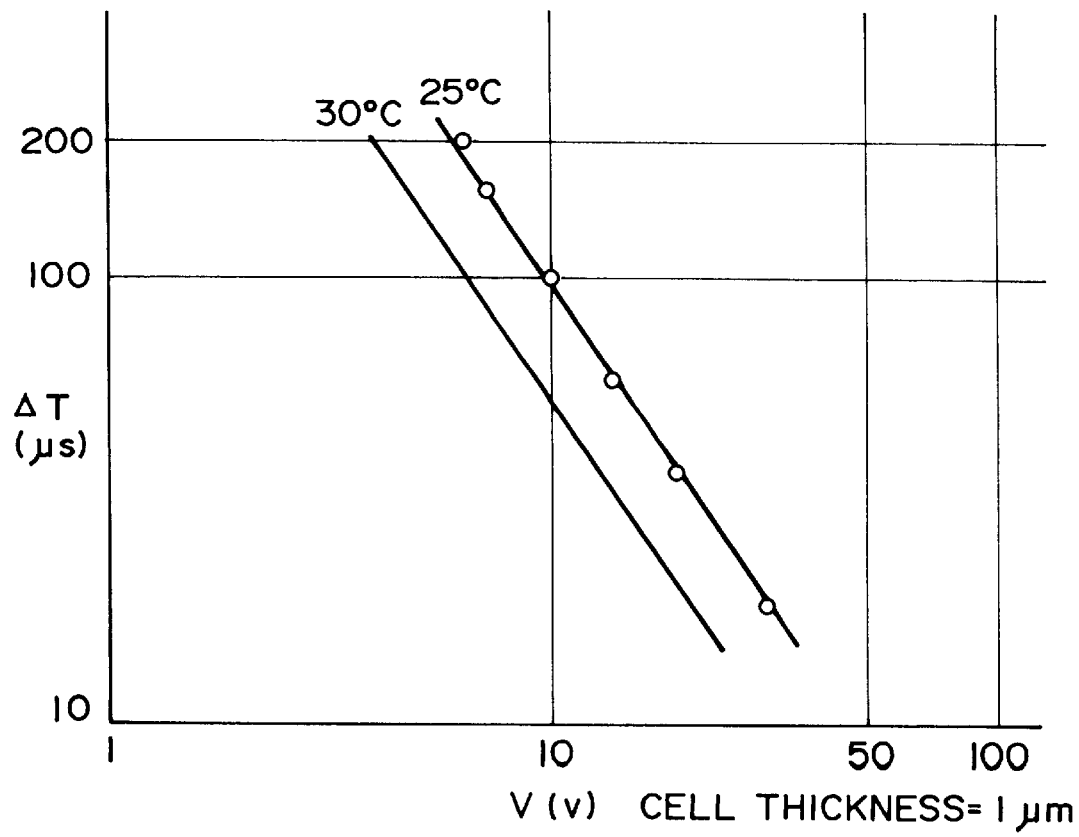
FIG. 10 is a graph showing a relationship between applied voltages and transmittances of a display apparatus according to Example 1.

The ferroelectric liquid crystal when used in a panel having a cell thickness of 1 μm showed a pulse width-voltage characteristic (a relationship between threshold switching pulse width and voltage) as shown in FIG. 10, thus showing, e.g., a threshold voltage intensity of 11.5 volt/μm at a pulse width of 80 μsec and 25° C. Accordingly, the liquid crystal panel (liquid crystal device) shown in FIG. 8 showed threshold voltages ranging from 11.5 volt–16.1 volt for an 80 μsec pulse at 25° C.

Figure 11:
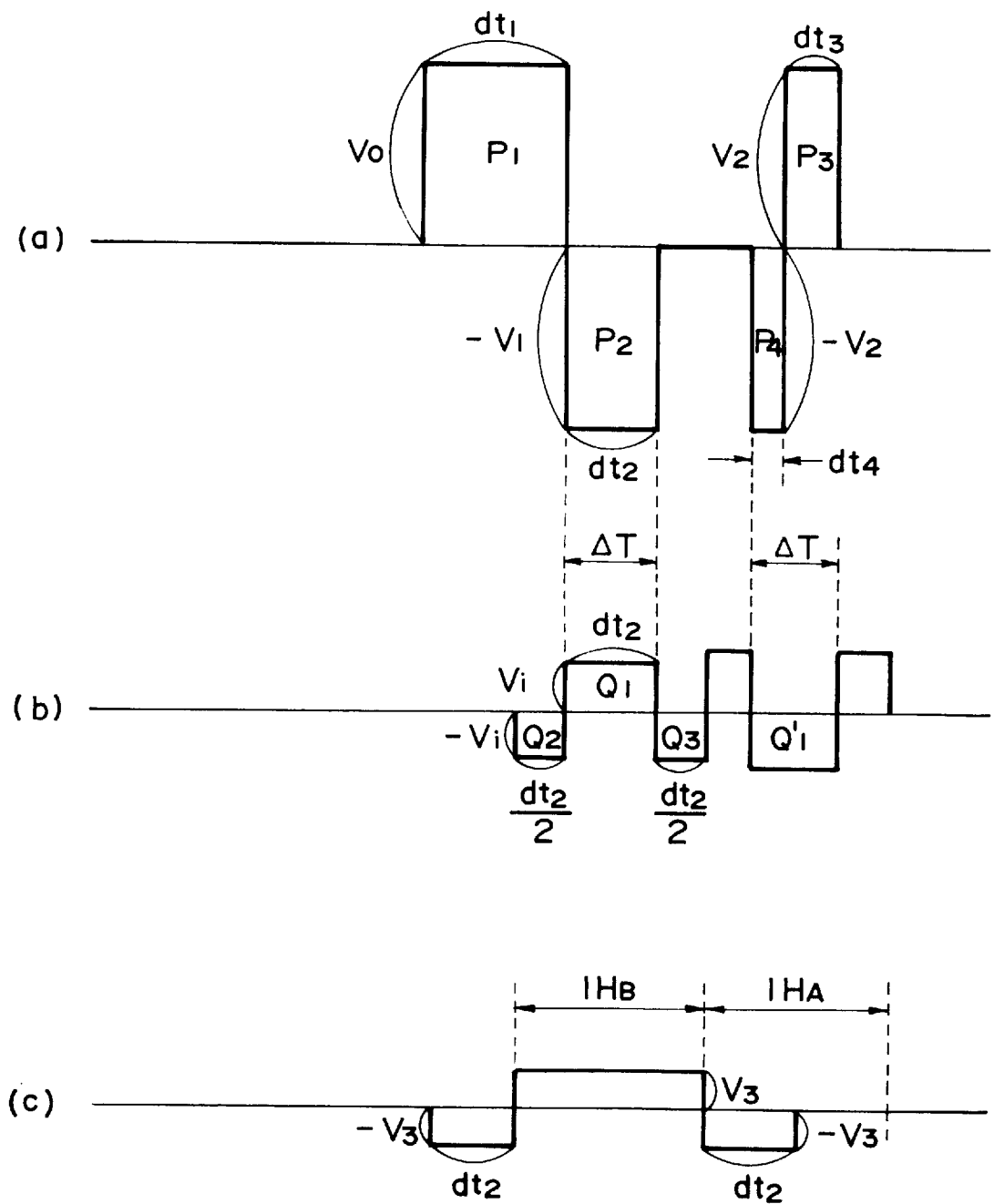
FIG. 11 is a schematic waveform diagram for illustrating a relationship among a scanning selection signal (a), a data signal (b) and a dummy signal (c) for a display apparatus according to Example 1.

FIG. 11 shows a set of driving voltage waveforms. Referring to FIG. 11, at (a) is shown a scanning signal waveform, at (b) is shown a data signal waveform, and at (c) is shown a dummy signal waveform as an improvement given by the present invention. The scanning signal waveform shown at (a) includes a reset pulse $P_1$, a selection pulse $P_2$ for writing on a scanning line concerned, a selection pulse $P_3$ for compensating for a threshold change of the ferroelectric liquid crystal as caused by a temperature change for an adjacent scanning line, and an auxiliary pulse $P_4$. The data signal waveform shown at (b) includes a selection pulse $Q_1$ carrying gradation data and auxiliary pulses $Q_2$ and $Q_3$ counterbalancing the DC component of $\theta_1$. In FIG. 11, $1H_B$ denotes a period of applying the data signal waveform for the scanning line concerned, and $1H_A$ denotes a period of applying the data signal waveform for the adjacent scanning line. Further, ΔT denotes a period in which the selection pulses $P_2$ and $Q_1$ and the selection pulse $P_3$ and $Q_1'$ are respectively synchronized. The dummy signal waveform shown at (c) is constituted as an alternating current waveform free from remaining DC component and designed to have a voltage which does not change the data in a pixel even if a combination thereof with a data signal is applied to the liquid crystal layer. The dummy signal is applied so as to apply a voltage insufficient to cause inversion of liquid crystal molecules but perturb the liquid crystal molecules to make the flickering unnoticeable.

Figure 12:
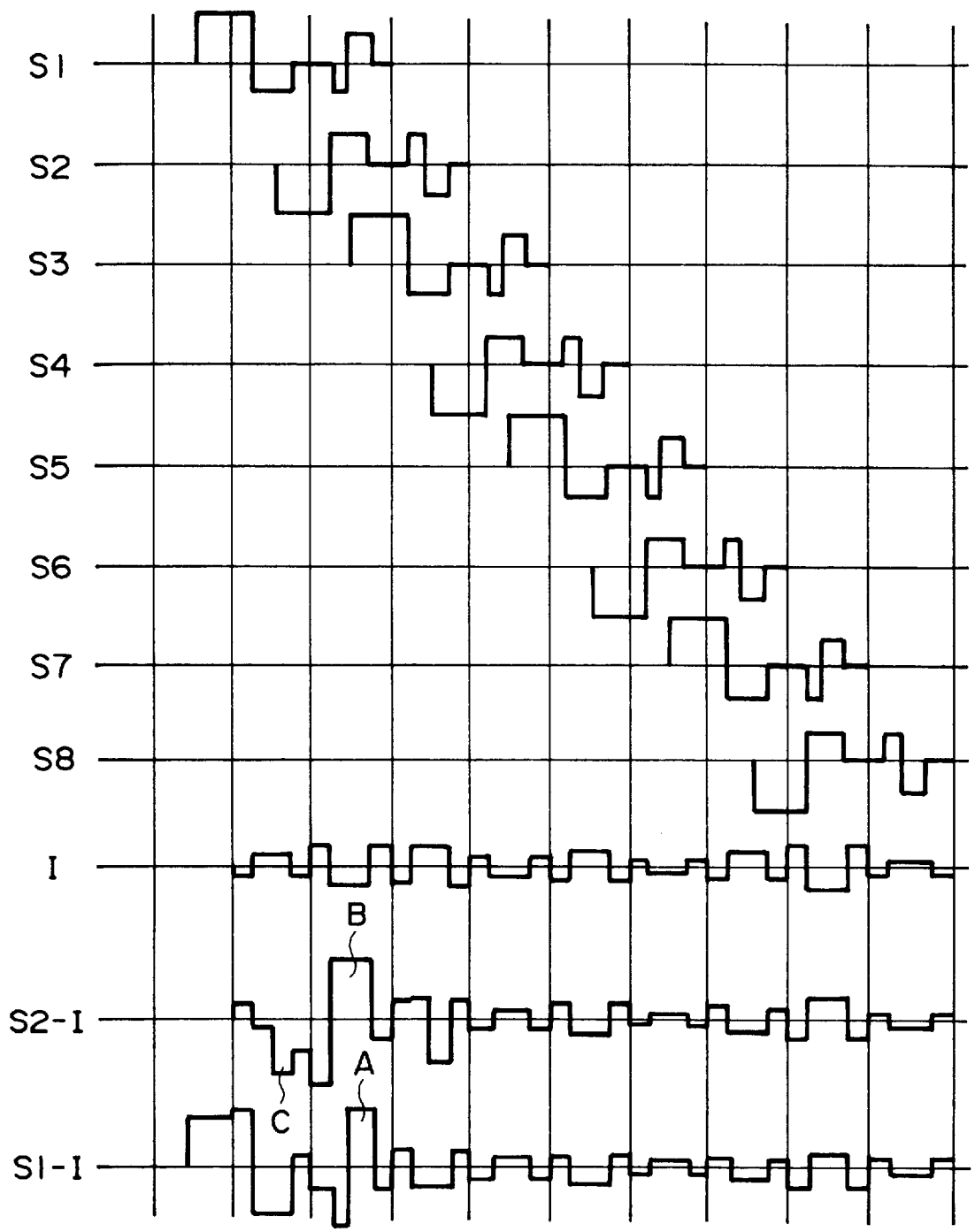
FIGS. 12 and 13 are drive timing charts for a display apparatus according to Example 1.
Figure 13:
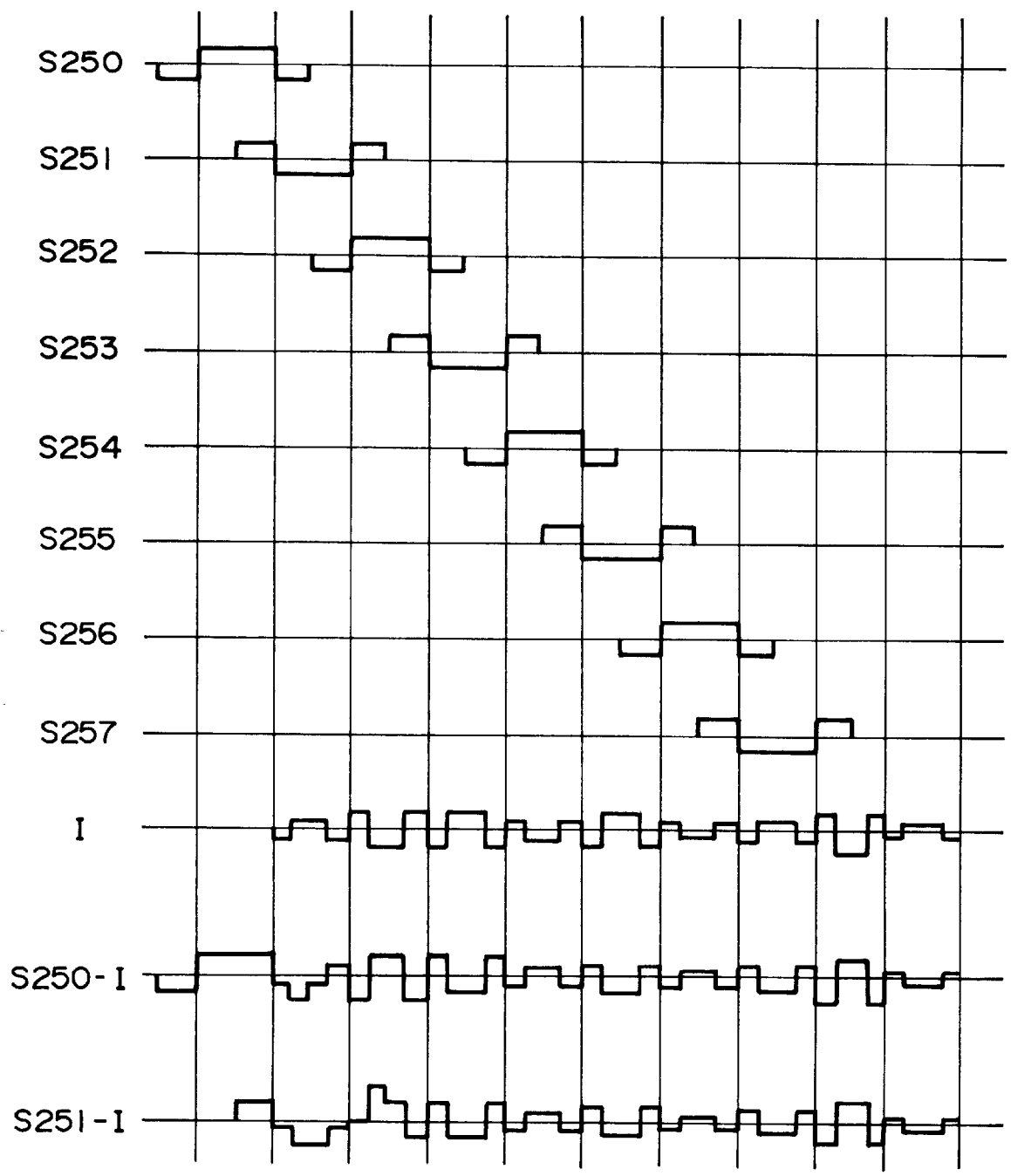

Next, the time serial setting and operation of the driving waveforms are described with reference to FIGS. 12 and 13. Referring to FIGS. 12 and 13, at $S_1$–$S_8$ and $S_{250}$–$S_{257}$ are shown selection signals and dummy signals, respectively, applied to, e.g., 16 scanning lines $S_1$–$S_8$ and $S_{250}$–$S_{257}$ among 1024 scanning lines $S_1$–$S_{1024}$ within an identical period.

For example, when a selection signal is applied to a scanning line. $S_1$, a dummy signal is simultaneously applied to four scanning lines $S_{251}$, $S_{501}$, $S_{751}$ and $S_{1001}$ actually in this embodiment. Then, when a selection signal is applied to a scanning line $S_2$, a dummy signal is applied to four scanning lines $S_{252}$, $S_{502}$, $S_{752}$ and $S_{1002}$. Further, the selection signal is line-sequentially applied to the subsequent scanning lines $S_3$–$S_{1024}$, while the dummy signal is simultaneously applied to three or four scanning lines spaced apart from each other by 250 lines based on the selected scanning line. As a result, each scanning line on the panel is supplied a selection signal or dummy signal at a time spacing which about one fourth of the time spacing wherein no dummy signal is applied.

At I is shown a data signal waveform applied to a certain data line I. At S1—I and S2—I are shown voltage profiles applied to pixels on a first scanning line $S_1$ and a second scanning line $S_2$ and receiving the data signal I. Similarly, at S250—I and S251—I are shown voltage profiles applied to pixels on a 250-th scanning line $S_{250}$ and a 251-th scanning line $S_{251}$ and receiving the data signal I.

In a particular example, the temperature distribution of the liquid crystal panel was suppressed within a range of 25°–30° C. by using a temperature regulation means, such as a temperature sensor, a heater and a fan, and the pulse width and voltage value of the respective pulses shown in FIG. 11 were set as follows:

$dt_1$=70 μsec, $dt_2$=50 μsec, $dt_3$=31 μsec, $dt_4$=19 μsec, $V_0$=25 volts, $V_1$=18 volts, $V_2$=18 volts, $V_3$=6 volts.

The voltage value Vi for displaying a gradation state of x % was determined based on the following formula (2) or (3):

At the time of white selection (writing white or a gradational state after clearing into black):

$$Vi = 18 - 18.4 \times 10^{(x/100 \times \log(25.8/18.4))}(V)(-7.8 \leq Vi \leq -0.4) \quad (2)$$

At the time of black selection (writing black or a gradational state after clearing into white):

$$Vi = 18.4 \times 10^{((100-x)/100 \times \log(25.8/18.4))} - 18(V)(0.4 \leq Vi \leq 7 \ldots 8) \quad (3)$$

The above voltage setting was based on a result that a reference pixel (at 25° C.) began to be partially written when supplied with a pulse of 18.4 volts and was fully written when supplied with an increased voltage pulse of 25.8 volts.

In a voltage profile S2—I applied to a pixel at an intersection of a scanning line $S_2$ and the data line I, a component C corresponds to a component functioning to clear all the pixels on the scanning line $S_2$, (i.e., write into black or white simultaneously) and a subsequent component B functions to write in the pixel at the intersection of the scanning line $S_2$ and the data line I. On the other hand, in a voltage profile S1—I applied to a pixel at an intersection of a scanning line $S_1$ and the data line I, a component A corresponds to data to be written in the pixel on the scanning line $S_1$ for temperature compensation of the pixel on the scanning line $S_2$. In FIG. 13, voltage profiles S251—I and S252—I applied to the pixels at the intersections of the data line I and the scanning lines $S_{251}$ and $S_{252}$, respectively, are also shown. As a result of gradational display using such a set of drive signal waveforms, it was possible to realize a stable gradational display while remarkably suppressing flickering in spite of a temperature irregularity (distribution of 25° C. to 30° C.) present on the liquid crystal panel.

FIG. 14 is a block diagram of the display apparatus according to the present invention including a display system.

The scanning lines of a liquid crystal device constituting a display panel are connected to a common-side drive IC 46 which is a means for selecting and applying a selection signal to the scanning lines and for applying a dummy signal, and the data lines of the liquid crystal device 41 are connected to a segment-side drive IC 43 as a means for applying data signals.

Image data from an image data generator 48, such as an image sensor or a wireless receiver, is separated into common-side signals and data-side signals which are separately controlled by a controller 49. In the common side, the scanning signal and dummy signal are produced based on a reference voltage distributed by an analog switch of a drive power supply by a shift register 47 and the drive IC 46.

On the other hand, in the segment side, digital gradational signals supplied via a shift resistor 45 and a latch circuit 44 are converted into analog signals by a D/A converter in the drive IC 43 and supplied to the data lines. For example, 4 bit digital signals can be converted into $2^4$ (i.e., 16) different analog signals.

In the above embodiment, the digital signals are latched before conversion into analog signals. However, it is also possible to adopt a system wherein analog signals are directly latched by disposing capacitors in parallel to the drive IC 43.

By using such a drive system for applying signals shown in FIGS. 12 and 13 to the liquid crystal device 41, it is possible to effect an analog gradational display free from flickering.

EXAMPLE 2

In the case of gradational display according to the two pulse method, the stability of gradational display can be increased by increasing the selection internval between adjacent scanning lines. In Example 1, the selection was made at an interval of 100 μsec, but it was confirmed that an increased selection interval of 150 μsec or longer could further stabilize the gradational display. This is presumably because, as for the ferroelectric liquid crystal used in Example 1, switching of the liquid crystal molecules was not completely finished within the voltage application period.

In this embodiment, an interlaced scanning scheme may be adopted in combination so as to effect a good image display even in the case of sequentially selecting the scanning lines with such a prolonged interval.

More specifically, in this embodiment, the scanning lines of a matrix panel as shown in FIG. 9 are divided into two blocks as shown in FIG. 15, and an interlaced scanning is performed. Referring to FIG. 15, a block A includes scanning lines $S_1$–$S_{512}$, and a block B includes scanning lines $S_{513}$–$S_{1024}$. The scanning lines are selected in the order of $S_1$, $S_{513}$, $S_2$, $S_{514}$, $S_3$, $S_{515}$, . . . , i.e., alternate selection from the respective blocks and line-sequential selection within each block. In this instance, a dummy signal is simultaneously applied to four scanning lines with a spacing of 250 lines each in the respective blocks. As a result, a good gradational display could be realized with remarkably suppressed flicker compared with the case where the dummy signal was not applied. This example was the same as Example 1 except for the difference in scanning scheme.

EXAMPLE 3

In this embodiment, such a dummy signal is applied to the scanning lines that the change in transmitted light quantity through pixels on a scanning line at the time of selection by application of a selection signal is substantially equal to the change in transmitted light quantity through pixels on a scanning line at the time of dummy signal application.

Figure 18:
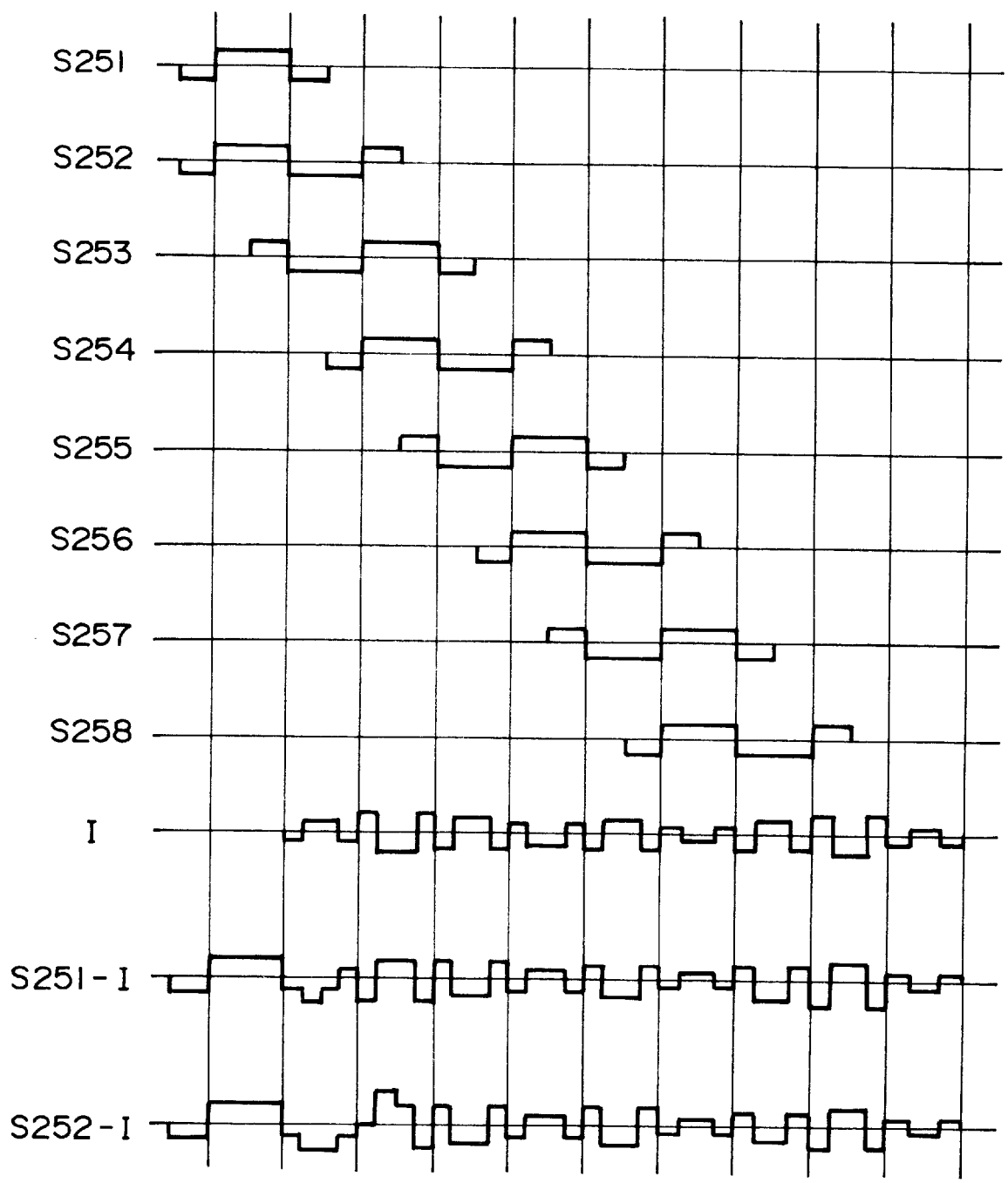

In the method described so far, a certain degree of flicker-removing effect is attained, if the transmitted light quantity change (I) at the time of selection of a scanning line and the transmitted light quantity change (II) at the time of dummy signal application satisfy a relationship of (I)/(II) $\leq 2.0$. In order to obtain a better result, it is desired that (I) and (II) are almost equal. If the transmitted light quantity change by application of a dummy signal is too large, one time of dummy signal application may not damage the image but a repetitive application of the dummy signal over several frames can gradually damage the image data. In order to avoid the problem, it is desired to suppress the transmitted light quantity change through the scanning line. For this reason, in this embodiment, a dummy signal is applied to consecutive two scanning lines and the voltage value of the dummy signal is lowered. A set of driving voltage waveforms used in this embodiment are shown in FIG. 16, and timing charts for application of the waveforms are shown in FIGS. 17 and 18.

As shown at S251–S258, the dummy signal is applied simultaneously to two scanning lines and also applied to the other scanning lines line-sequentially. For example, scanning line $S_{251}$ and $S_{252}$ are simultaneously supplied with a voltage $+V_S$. In a particular example, the pulse width and voltage value of the respective pulses shown in FIG. 16 were set as follows:

$dt_1=70$ μsec, $dt_2=50$ μsec, $dt_3=31$ μsec, $dt_4=19$ μsec, $V_0=25$ volts, $V_1=18$ volts, $V_2=18$ volts, $V_3=4.5$ volts.

The voltage value Vi for displaying a gradation state of x % was determined based on the above-mentioned formula (2) or (3).

By suppressing the degree of perturbation of liquid crystal molecules caused by application of a dummy signal for one scanning line, it was possible to realize a ferroelectric liquid crystal display apparatus with a further improved stability. The liquid crystal device used in Example 3 was the same as in Example 1, and the other conditions were also the same as in Example 1 except for the above-described drive conditions.

As described hereinabove, by applying a selection signal to a scanning line and simultaneously applying a dummy signal to another scanning line according to the present invention, it has become possible to realize good binary display and gradational display free from or with less flickering even if one-line scanning speed is slow.

What is claimed is:

1. A display apparatus, comprising:
   a display device comprising a plurality of scanning lines, a plurality of data lines intersecting the scanning lines, and a pixel formed at each intersection of the scanning lines and data lines and showing plural display states depending on signals applied to an associated scanning line and an associated data line,
   a scanning line-drive circuit for applying a selection signal to a scanning line in a selection period and providing a reference voltage to a scanning line in a non-selection period; and a data line-drive circuit for applying data signals to the data lines, each data signal in combination with the selection signal providing a voltage signal determining a display state at an associated pixel, said scanning line-drive circuit further applying a dummy signal having a waveform different from that of the selection signal, applied separately from the selection signal and comprising a prescribed voltage pulse component to a scanning line in its non-selection period, during which the selection signal is applied to at least one other scanning line, said dummy signal providing, in combination with each data signal, a voltage signal which temporarily changes a prescribed display state of an associated pixel but restores the prescribed display state after termination of the voltage signal.

2. A display apparatus according to claim 1, wherein said selection signal is line-sequentially applied to the scanning lines and said dummy signal is line-sequentially applied to the scanning lines so that a particular scanning line receives a dummy signal after a prescribed period after receiving a selection signal.

3. A display apparatus according to claim 1, wherein said prescribed period is 33 msec or shorter.

4. A display apparatus according to claim 1, wherein a pixel on a scanning line receiving a selection signal causes a change in transmitted light quantity which is at most two times that caused by a pixel on a scanning line receiving a dummy signal.

5. A display apparatus according to claim 1, wherein said dummy signal is simultaneously applied to a plurality of scanning lines.

6. A display apparatus according to claim 1, wherein said dummy signal is a signal which is sufficient to change optical transmittance through associated pixels on a scanning line receiving the dummy signal but insufficient to switch a liquid crystal showing bistability from one stable state to the other stable state at the associated pixels.

7. A display apparatus according to claim 1, wherein said data signals comprise gradation data.

8. A display apparatus according to claim 1, wherein said display states include at least three different optical transmittances at the pixels.

9. A display apparatus according to claim 1, wherein said selection signal is applied to at least two adjacent scanning lines.

10. A display apparatus, comprising:

a display device comprising a plurality of scanning lines, a plurality of data lines intersecting the scanning lines, and a pixel formed at each intersection of the scanning lines and the data lines and showing plural display states depending on signals applied to an associated scanning line and an associated data line, a scanning line-drive circuit for applying a selection signal to at least two adjacent scanning lines in a selection period and providing a reference voltage to a scanning line in a non-selection period; and, a data line-drive circuit for applying data signals to the data lines, each data signal in combination with the selection signal providing a voltage signal determining a display state at an associated pixel, said scanning line-drive circuit further applying a dummy signal having a waveform different from that of the selection signal, applied separately from the selection signal and comprising a prescribed voltage pulse component to a scanning line in its non-selection period, during which the selection signal is applied to at least one other scanning line, said dummy signal providing, in combination with each data signal, a voltage signal which temporarily changes a prescribed display state of an associated pixel but restores the prescribed display state after termination of the voltage signal.

11. A display apparatus according to claim 10, wherein said pixel includes a liquid crystal layer.

12. A display apparatus according to claim 10, wherein said liquid crystal layer comprises a ferroelectric liquid crystal.

13. A display apparatus according to claim 11, wherein said pixel includes a ferroelectric liquid crystal layer, and plural domains of the ferroelectric liquid crystal in the pixel are inverted depending on the gradation data.

* * * * *

UNITED STATES PATENT AND TRADEMARK OFFICE
CERTIFICATE OF CORRECTION

PATENT NO. : 5,844,536

DATED : December 1, 1998

INVENTOR(S) : SHINJIRO OKADA, ET AL.

It is certified that error appears in the above-identified patent and that said Letters Patent is hereby corrected as shown below:

<u>ON TITLE PAGE, AT [56], REFERENCES CITED, FOREIGN PATENT DOCUMENTS</u>
  "0394903" should read --1-394903--;
  "02162322" should read --2-162322--.

<u>COLUMN 5</u>
  Line 66, "(TSD)" should read --($T_{SD}$)--.

<u>COLUMN 6</u>
  Line 5, "(fth)" should read --($f_{th}$);
  Line 13, "fth" should read --$f_{th}$--;
  Line 46, "have" should read --has--.

<u>COLUMN 7</u>
  Line 19, "issue" should read --issued--.

<u>COLUMN 10</u>
  Line 1, "which" should read --which is--;
  Line 44, "(0.4≦ Vi ≦ 7...8)" should read
    --(0.4 ≦ Vi ≦ 7.8)==.

Signed and Sealed this

Twenty-eighth Day of March, 2000

Q. TODD DICKINSON

*Attest:*

*Attesting Officer*      Commissioner of Patents and Trademarks